United States Patent [19]
Hsiao

[11] Patent Number: 5,430,887
[45] Date of Patent: Jul. 4, 1995

[54] CUBE-LIKE PROCESSOR ARRAY ARCHITECTURE

[75] Inventor: Meng-Ling Hsiao, Schenectady, N.Y.

[73] Assignee: General Electric Company, Schenectady, N.Y.

[21] Appl. No.: 962,567

[22] Filed: Oct. 19, 1992

[51] Int. Cl.⁶ ............... G06F 15/163; G06F 15/16
[52] U.S. Cl. ............... 395/800; 364/229; 364/231.9; 364/931.01; 364/931.4; 364/940.61; 364/940.64; 364/DIG. 2
[58] Field of Search ............... 395/800, 200, 325

[56] References Cited

U.S. PATENT DOCUMENTS

| | | | |
|---|---|---|---|
| 5,020,059 | 5/1991 | Gorin et al. | 371/11.3 |
| 5,038,386 | 8/1991 | Li | 382/49 |
| 5,047,917 | 9/1991 | Athas et al. | 395/325 |
| 5,113,523 | 5/1992 | Colley et al. | 395/800 |
| 5,157,785 | 10/1992 | Jackson et al. | 395/800 |
| 5,159,690 | 10/1992 | Margolus et al. | 395/800 |
| 5,274,832 | 12/1993 | Khan | 395/800 |
| 5,301,104 | 4/1994 | Yalamanchili | 395/800 |

*Primary Examiner*—Thomas G. Black
*Assistant Examiner*—Paul Harrity
*Attorney, Agent, or Firm*—David C. Goldman; Paul R. Webb, II

[57] ABSTRACT

According to the present invention, a 3D connectivity-conserved grain-structured processing architecture uses connectable massively parallel processors. A 3D grain-structured processing architecture is provided. The 3D links of the grain-structured processing architecture provide direct local communication as well as global communication for voxel processing and analysis tasks. A novel transport naming scheme which is scalable in any three-dimension direction and the local/global communication protocol are disclosed. The 3D volumetric data set is first divided into a set of voxel sub-cubes. Each voxel subcube is processed by a processor element of the grain-structured processing architecture. Data discontinuity is produced after performing local operations in a massively parallel processors environment and requires replacing the resulted voxel data set in the overlap region for each voxel sub-cube. An inter-processor communication procedure for overcoming this problem in the 3D connected grain-structured processors architecture is also disclosed.

13 Claims, 10 Drawing Sheets

CUBE-LIKE PROCESSOR ARRAY ARCHITECTURE

BACKGROUND OF THE INVENTION

The present invention relates to the field of parallel computation in general and more specifically to a method and apparatus for processing three dimensional volume element (voxel) data for image processing applications.

Internal integrity verification of industrial products is currently achieved by processing two-dimensional images, whereby only two-dimensional connectivity is taken into consideration. However, 2D image analysis can produce ambiguity in decision making and provide inaccurate measurements fore complex structured parts. For instance, when the X-ray projection plane cuts through the cracking direction of an elongated flaw, low detectability results due to the low signal-to-noise ratio of the data. Further, in some systems, wall thickness measurements are done on a slice-by-slice basis. In this case, accurate measurement can only be achieved when the normal of the projection plane is perpendicular to the surface normal of the inspected wall. In practice, this requirement is not met due to the curved nature of parts. In both cases, true 3D analysis is required.

Challenges of 3D voxel processing and analysis include developing robust algorithms which exploit the true 3D nature of large data sets, providing the demanded processing speed and throughput, and handling the computation complexity. For instance, size may range from 0.5 Gbytes for a single blade to more than 200 Gbytes for a large casting. Computation complexity also increases dramatically for 3D connectivity-conserved processing. Based on the existing technology, it will take from 8 hrs. to more than 5000 hrs. processing time to inspect a part. In order to achieve practical 3D voxel processing and analysis for inspecting large industrial parts, massively parallel processors are required.

SUMMARY OF THE INVENTION

The parallel processing architecture according to the present invention is constructed using connectable massively parallel processing elements connected in a cubic structure whereby each internal processing unit is directly connected to, and is capable of communicating directly with, six neighbor processor elements. Highly parallel image processing algorithms which must conserve 3D connectivity are efficiently carried out in such an architecture and communication scheme. Six-way communication is maintained even on the edge and vertex processors by providing a means for cross-row, cross-column, and cross-plane communication, thereby making traversal of the whole structure easy. Finally a method is disclosed for dealing with the problem of incomplete data at the cube boundaries by performing data padding and swapping.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE DRAWINGS

Figure 1:
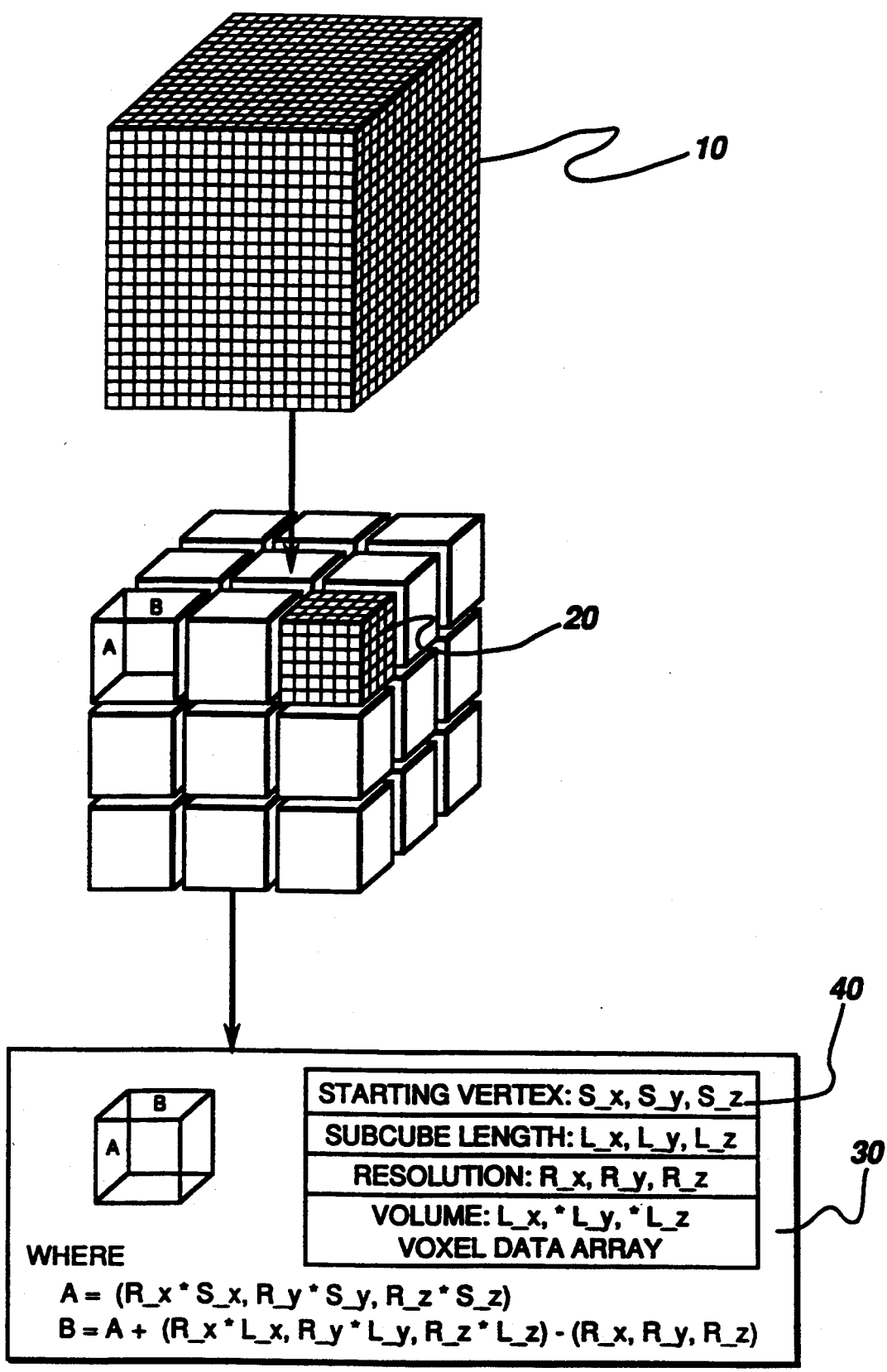
FIG. 1 shows a 3D data set decomposition.

FIG. 1 shows a 3D voxel data set 10, arranged as a cube, which can be any three-dimensional data set including medical and industrial data such as obtained using known imaging techniques including computed tomography (CT). In various imaging applications, many algorithms exist for processing 3D data which can benefit from parallel processing since it is often necessary to perform the same operation on each volume element (voxel) in the data set. By performing the operations concurrently in a parallel computer, as opposed to serially in a serial computer, great efficiency is realized.

In order to efficiently access the 3D voxels 10 during processing, the voxels are decomposed into a set of voxel sub-cubes 20. This reduces data access time and provides an ability to process volumes of interest. A voxel organized data structure 30 consists of multiple data packages 40. Each data package 40 corresponds to one sub-cube 20. Global information, such as relative position in the coordinate system are stored in each sub-cube structure 30 in order to preserve the complete 3D geometry information.

Figure 2A:
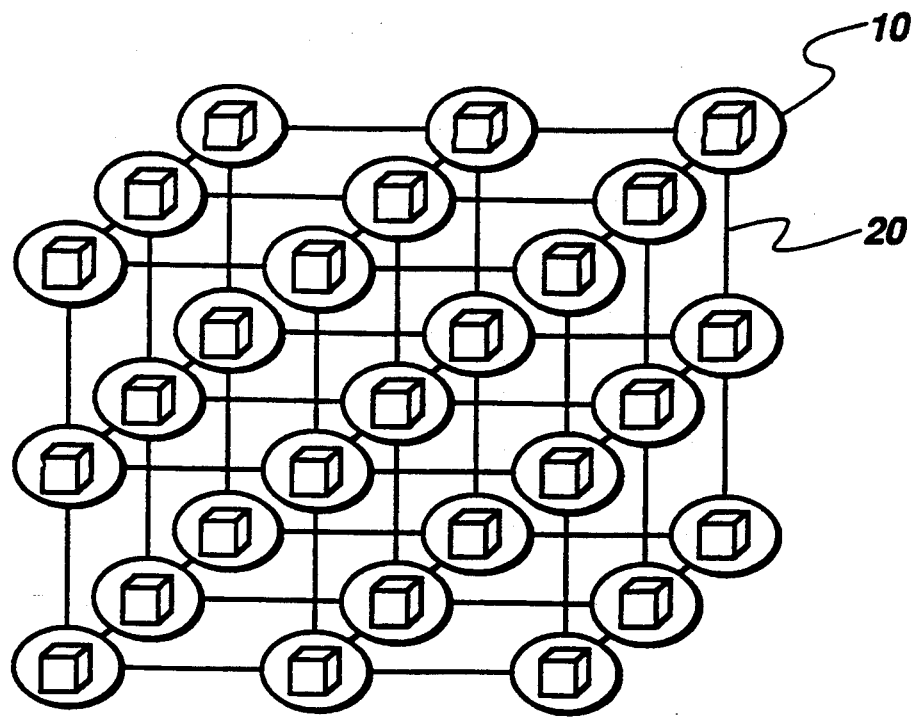
FIGS. 2a and 2b show a parallel architecture and its processor elements according to the present invention.
Figure 2B:
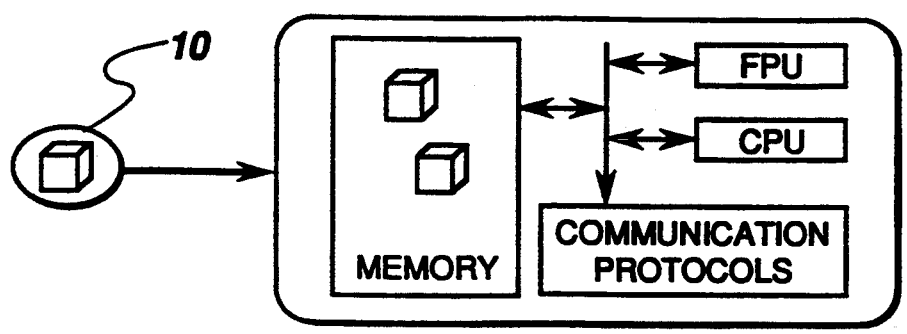

FIG. 2a shows a 27-processor element architecture for a parallel computer. Connectable massively parallel processors 10 are connected via communication channels 20 which provide nearest-neighbor communication for every processor 10. Each processor 10 consists of a CPU, a floating point unit (FPU), a memory, and six communication protocols as shown in FIG. 2b.

Figure 3:
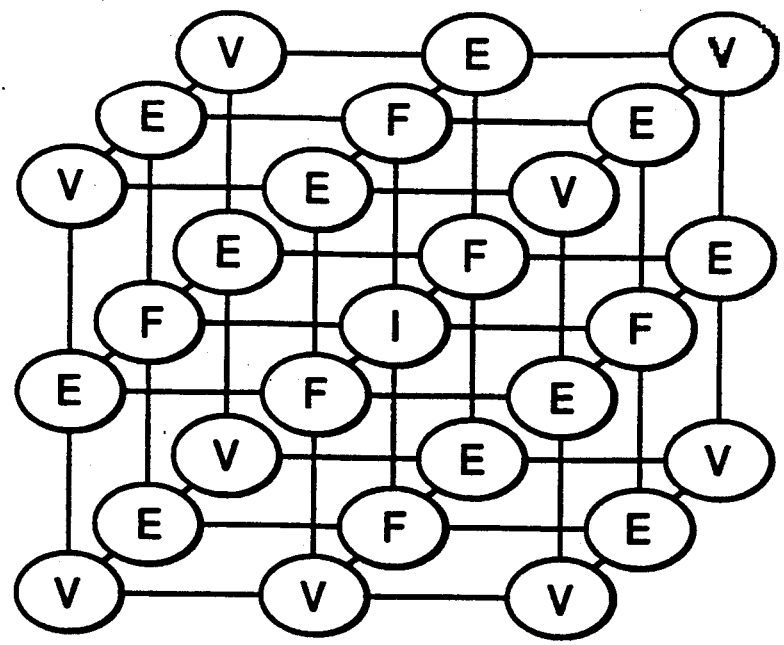
FIG. 3 shows the categories of processor elements.

Each processor element is indexed by its position in the Cartesian coordinate system and is denoted as PE-(I,J,K), where $0 \leq I$, $N_x$, $0 \leq J$, $N_y$, and $0 \leq K$, $N_z$ for an $N_x \times N_y \times N_z$ element grain-structured processing architecture. Based on the location of each processor element, each processor element 10 in the grain-structured processing architecture 20 can be classified into one of four categories: Internal-Processor-Element, (I), Vertex-Processor-Element (V), Edge-Processor-Element (E), and Face-Processor-Element (F). This is illustrated in FIG. 3. Each Internal-Processor-Element is connected to its six-connected neighbor processor elements PE(I−1,J,K), PE(I+1,J,K), PE(I,J−1,K), PE-(I,J+1,K), PE(I,J,K−1), and PE(I,J,K+1). For an $N_x N_y \times N_z$ element processing architecture, the processor element PE (I,J,K) belongs to the Internal-Processor-Element category if and only if all the following conditions are satisfied: $0 < I < (N_x-1)$, $0 < J < (N_y-1)$ $0 < K < (N_z-1)$. Processor elements which do not have six-connected neighbor processor elements in the grain-structured processing architecture are classified into the Border-Processor-Element category. This category can be further divided into three subcategories; the Vertex-Processor-Element, the Edge-Processor-Element, and the Face-Processor-Element categories as shown in FIG. 3. For an $N_x \times N_y \times N_z$ element processing architecture, the processor element PE (I,J,K) belongs to the Face-Processor-Element category if and only if two of the following conditions are satisfied: $0 < I < (N_x-1)$, and $0 < J < (N_y-1)$ and $0 < K < (N_z-1)$. Processor-Element PE (I,J,K) belongs to the Edge-Processor-Element category if and only if one of the following conditions is satisfied: $0 < I < (N_x-1)$, and $0 < J < (N_y-1)$ and $0 < K < (N_z-1)$. And processor element PE (I,J,K) belongs to the Vertex-Processor-Element category if and only if none of the following conditions are satisfied: $0 < I < (N_x-1)$, and $0 < J < (N_y-1)$ and $0 < K < (N_z-1)$.

Figure 4A:
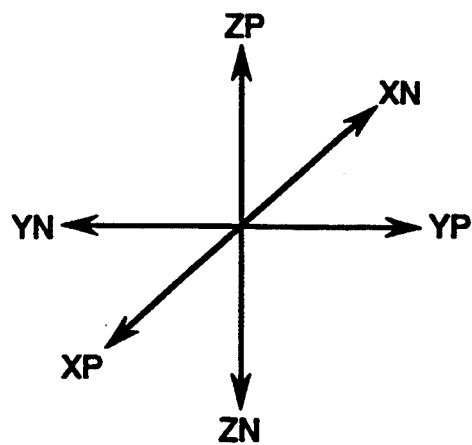
FIG. 4a shows the six communication directions for a processor element.
Figure 4B:
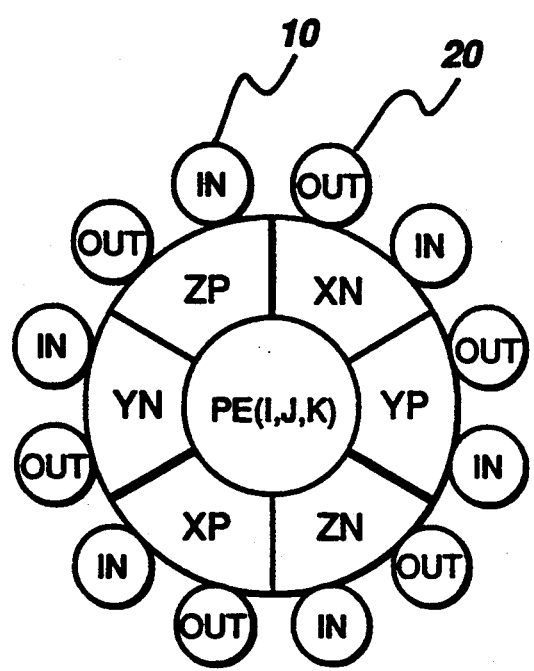
FIG. 4b shows the six communication channels for a processor element.
Figure 5:
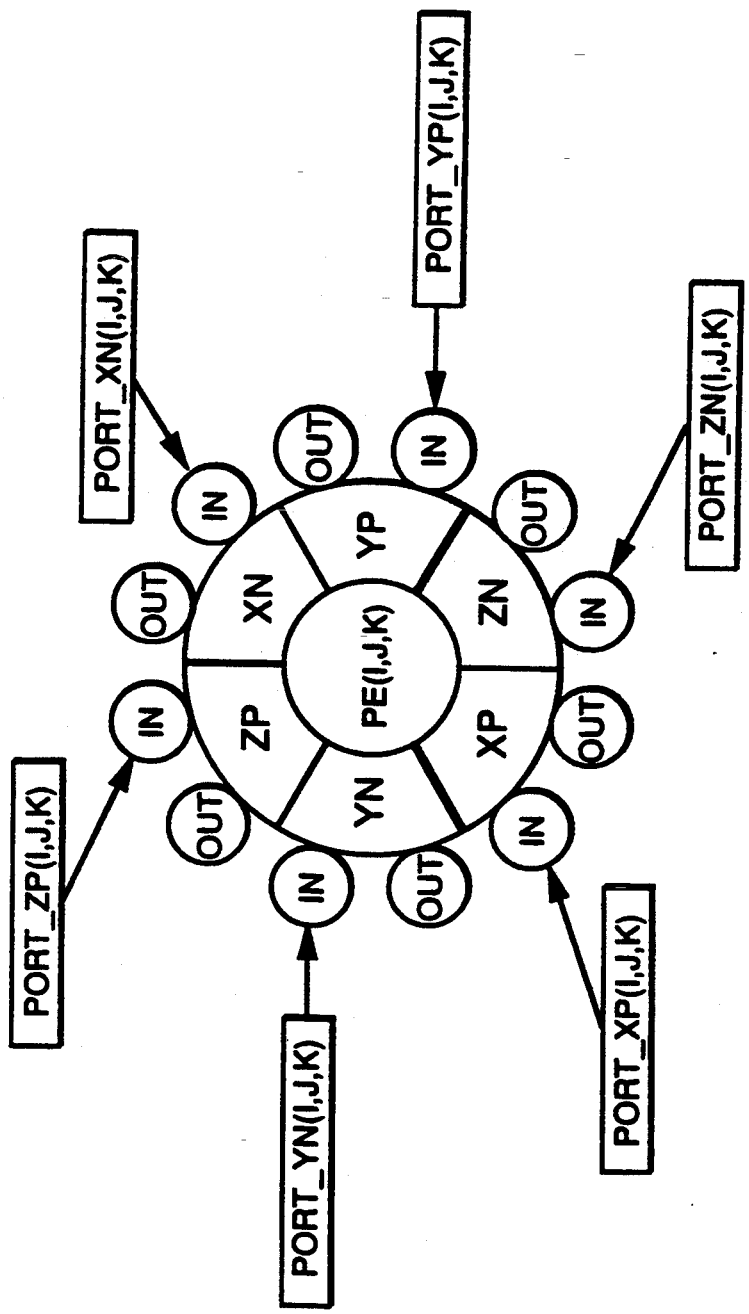
FIG. 5 shows the input communication transports for a processor element.
Figure 6:
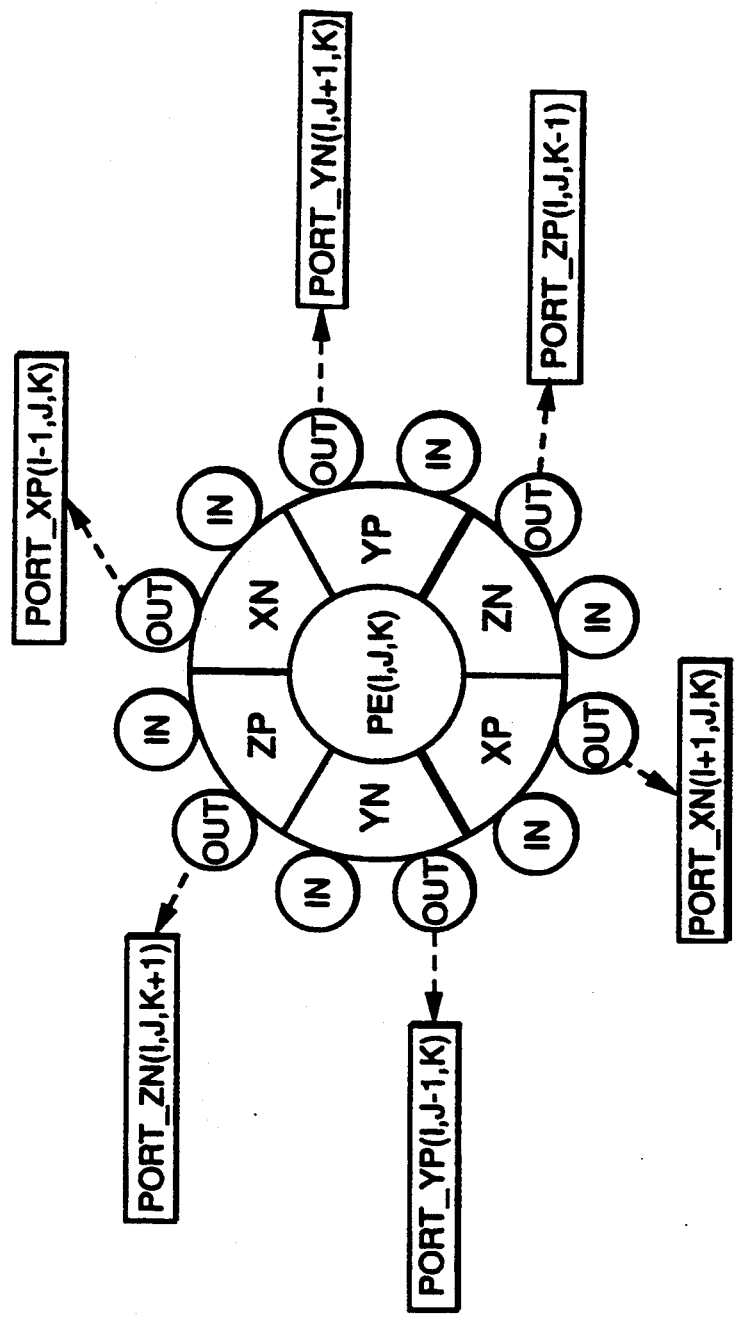
FIG. 6 shows the output communication transports for a processor element.
Figure 7:
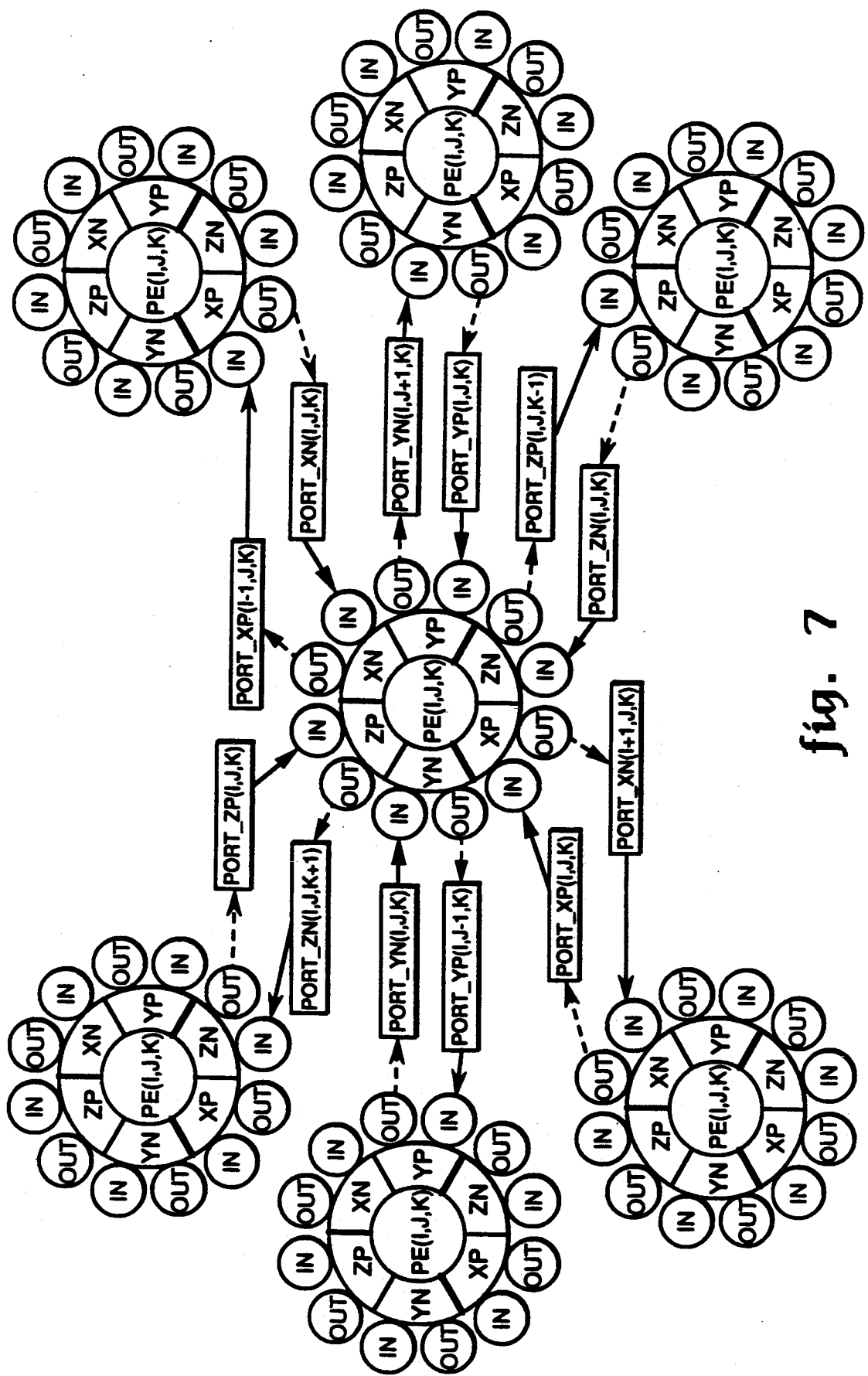
FIG. 7 shows the relationship of the input/output communication transports in the overall network.

A novel transport naming scheme has been designed to direct communication among the processor elements in the grain-structured processing architecture. For each processor element PE (I,J,K), there are six input communication transports and six output communication transports along the six communication directions; XP, XN, YP, YN, ZP, ZN, as shown in FIG. 4a. XP indicates the positive direction of the X axis, XN the negative direction of the X axis, YP the positive direction of the Y axis, etc. As shown in FIG. 4b, input communication transports 10 are used for receiving messages and output communication transports 20 are used for sending messages. For each processor element PE-(I,J,K), six input communication transports used to receive information from its nearest neighbor processor elements are assigned and are uniquely named as PORT_ZN (I,J,K) as shown in FIG. 5. For each processor element PE (I,J,K), six output communication transports used for sending information to its nearest neighbor processor elements are identified as PORT_XP-(I−1,J,K), PORT_XN(I+1,J,K) PORT_YP (I,J−1,K), PORT_YN(I,J+1,K), PORT_ZP-(I,J,K−1), and PORT_ZN(I,J,K+1), as shown in FIG. 6. FIG. 7 illustrates the relationship of the twelve communication transports related to the Internal-Processor-Element PE (I,J,K) and its six immediate connected processor elements PE(I−1,J,K), PE-(I+1,J,K), PE(I,J−1,K), PE(I,J+1,K), PE(I,J,K+1), and PE(I,J,K−1). For an $N_x \, N_y \times N_z$ element grain-structured processing architecture, $N_x \times N_y \times N_z \times 6$ communication transports are required to establish a complete communication protocol.

Figure 8A:
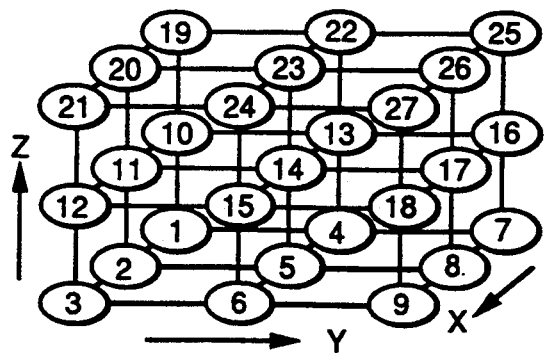
FIGS. 8a, 8b, 8c, and 8d show communication protocols for edge-processors.
Figure 8B:
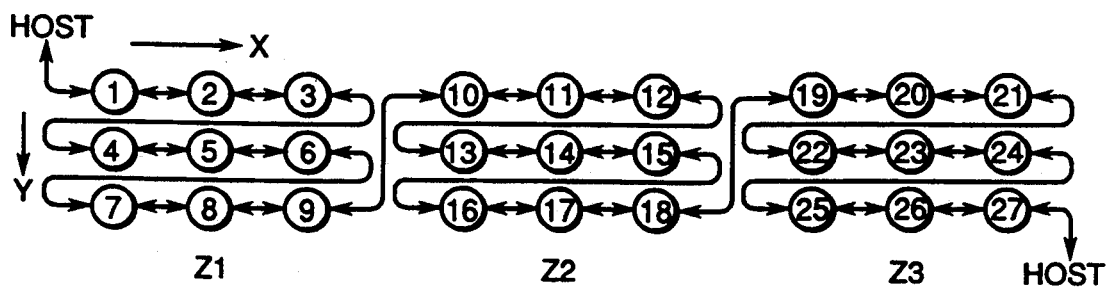
Figure 8C:
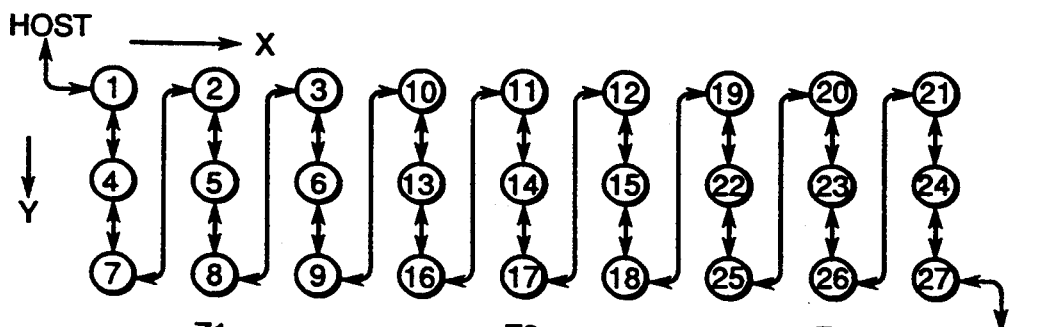
Figure 8D:
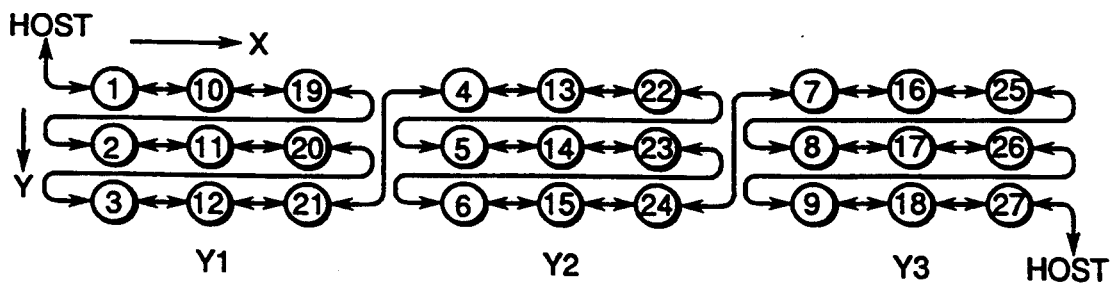

For each processor element PE(I,J,K), information can be received from or sent to one of the six communication directions: XP, XN, YP, YN, ZP, and ZN. Local communication can be achieved by synchronizing the communication between two nearest neighbor processor elements. For instance, to reach processor element PE(I,J,K), sending a message along the XP direction is synchronized with receiving a message from the XN direction by the processor element PE(I+1,J,K). Hence, for the processor element PE (I,J,K) to get information from its neighbor processor element PE-(I+1,J,K) along the XP direction, processor element PE(I+1,J,K) sends information to its output transport in the XN direction and processor element PE(I,J,K) receives information from its input transport in the XP direction. There are six input communication transports assigned to each of the Border-Processor-Elements. Some of the input communication transports are used to communicate with the PE's nearest neighbors as in the case of the Internal-Processor-Elements. The rest of the input communication transports are assigned for cross-row, cross-column, and cross-plane communication to ensure complete six directional communication for all the processor elements in the 3D grain-structured processing architecture. FIGS. 8b through 8d illustrate the network topology for cross-row, cross-column, and cross-plane communication respectively, based on the network topology shown in FIG. 8a. For each Border-Processor-Element PE(I,J,K), the following rules are applied to identify the output communication transports required to communicate with cross-row, cross-column, and cross-plane connected neighbor processor elements.

[a]. Cross-Row Communication:
  if $I(I+1)=N_x$, and $(J+1) \neq N_y$ then
    XP: PE(I,J,K)⇒PORT_XN (0,J+1,K)
  else if $(I+1)=N_x$, and $(J+1)=N_y$, and $(K+1) \neq N_z$ then
    XP: PE(I,J,K)⇒PORT_XN(0,0,K+1) else
    XP: PE (I,J,K)⇒PORT_XN(host)
  if $(I-1)<0$, and $(J-1) \geq 0$ then
    XN: PE(I,J,K)⇒PORT_XP(0,J−1,K)
  else If $(I-1)<0$, and $(J-1)<0$, and $(K-1) > 0$ then
    XN: PE(I,J,K)⇒PORT_XP(0,0,K−1) else
    XN: PE(I,J,K)⇒PORT_XP(host)

[b]. Cross-Column Communication:
  if $(J+1)=N_y$, and $(I+1) \neq N_x$ then
    YP: PE(I,J,K)⇒PORT_YN(I+,0,K)
  else if $(J+1)=N_y$, and $(I+1)=N_x$, and $(K+1) \neq N_z$ then
    YP: PE(I,J,K)⇒PORT_YN(0,0,K+1) else
    YP: PE (I,J,K)⇒PORT_YN(host)
  if $(J-1)<0$, and $(I-1) \geq 0$ then
    YN: PE(I,J,K)⇒PORT_YP(I−1,0,K)
  else If $(J-1)<0$, and $(I-1)<0$, and $(K-1)>0$ then
    YN: PE(I,J,K)⇒PORT_YP(0,0,K−1) else
    YN: PE (I,J,K)⇒PORT_YP (host)

[c]. Cross-Plane Communication:
  if $(K+1)=N_z$, and $(I+1) \neq N_x$ then
    ZP; PE(I,J,K)⇒PORT_ZN(I+1,J,0)
  else if $(K+1)=N_z$, and $(I+1)=N_x$ and $(J+1) \neq N_y$ then
    ZP: PE(I,J,K)⇒PORT_ZN(0,J+1,0) else
    ZP: PE(I,J,K)⇒PORT_ZN(host)
  if $(K-1)<0$, and $(I-1) \geq 0$ then
    ZN: PE(I,J,K)⇒PORT_ZP (I−1,J,0)
  else IF $(K-1)<0$, and $(I-1)<0$, and $(J-1) \geq 0$ then
    ZN: PE(I,J,K)⇒PORT_ZP(0, J−1,0) else
    ZN: PE(I,J,K)⇒PORT_ZP (host)

Figure 9A:
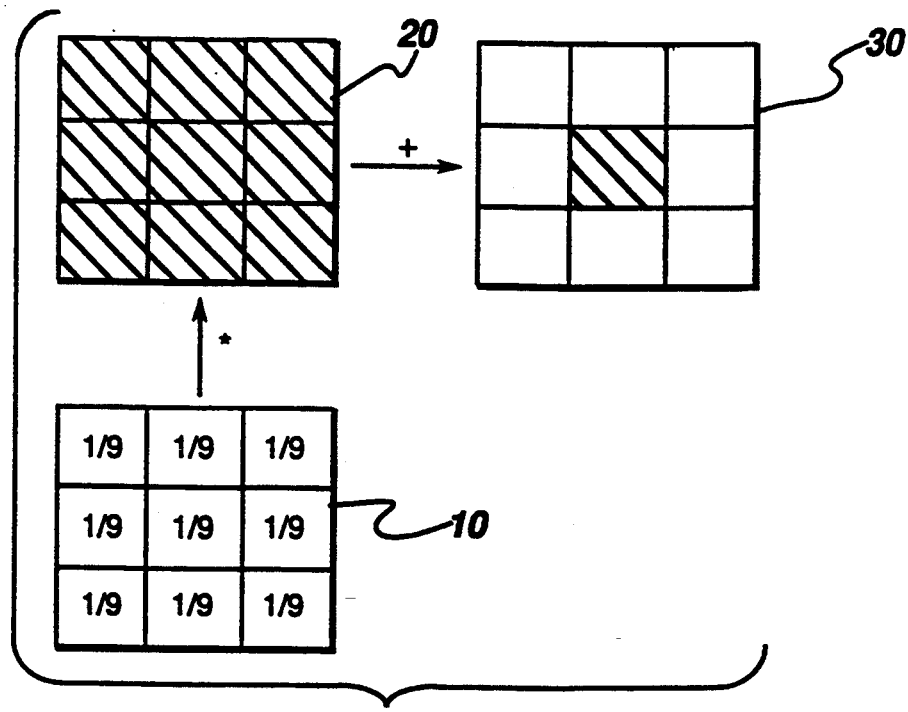
FIGS. 9a and 9b depict the problem of data incompleteness.
Figure 9B:
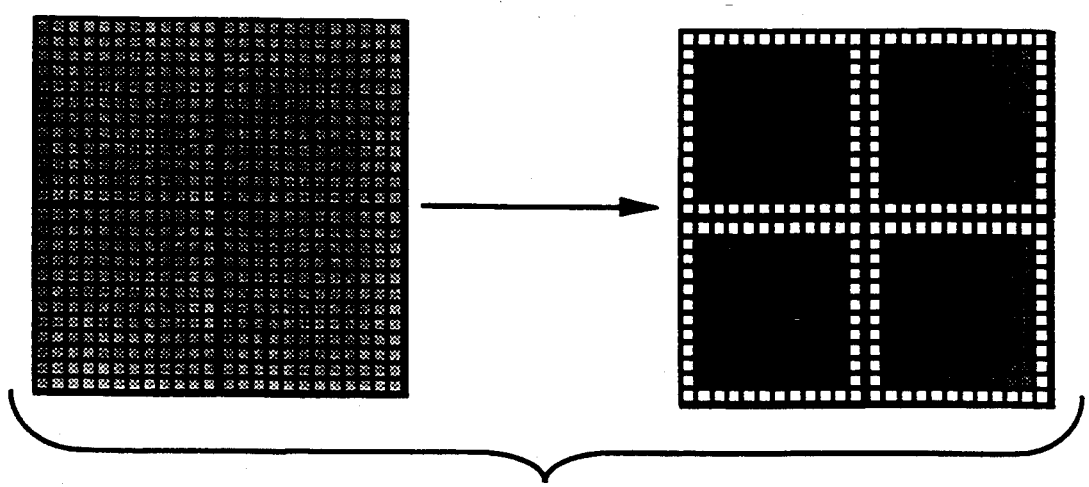

Mapping the decomposed voxel subcubes into the parallel computer shown in FIG. 2a is straightforward since the data maps directly into the physical structure of the computer. Local operations can be performed on the data in a manner akin to moving the computer around the 3D data. Data discontinuity at the borders of the subcubes results, however, after performing local operations. This result is illustrated in FIG. 9a where a simple operation takes the average value of all of the pixels surrounding a given pixel. This example could be extended to 3D. Kernel 10 is shown being applied to the center pixel of the set of pixels 20 to produce the output pixel in the center of the output set 30. If the same kernel were to be applied to any of the outer pixels in the set 20, the problem of data discontinuity will result since some of the needed pixels are not present (in the case of a corner pixel, only three pixels are present). Referring now to FIG. 9b, data is missing around the border of each of the voxel sub-cubes after applying a 3×3 convolution operation.

Figure 10:
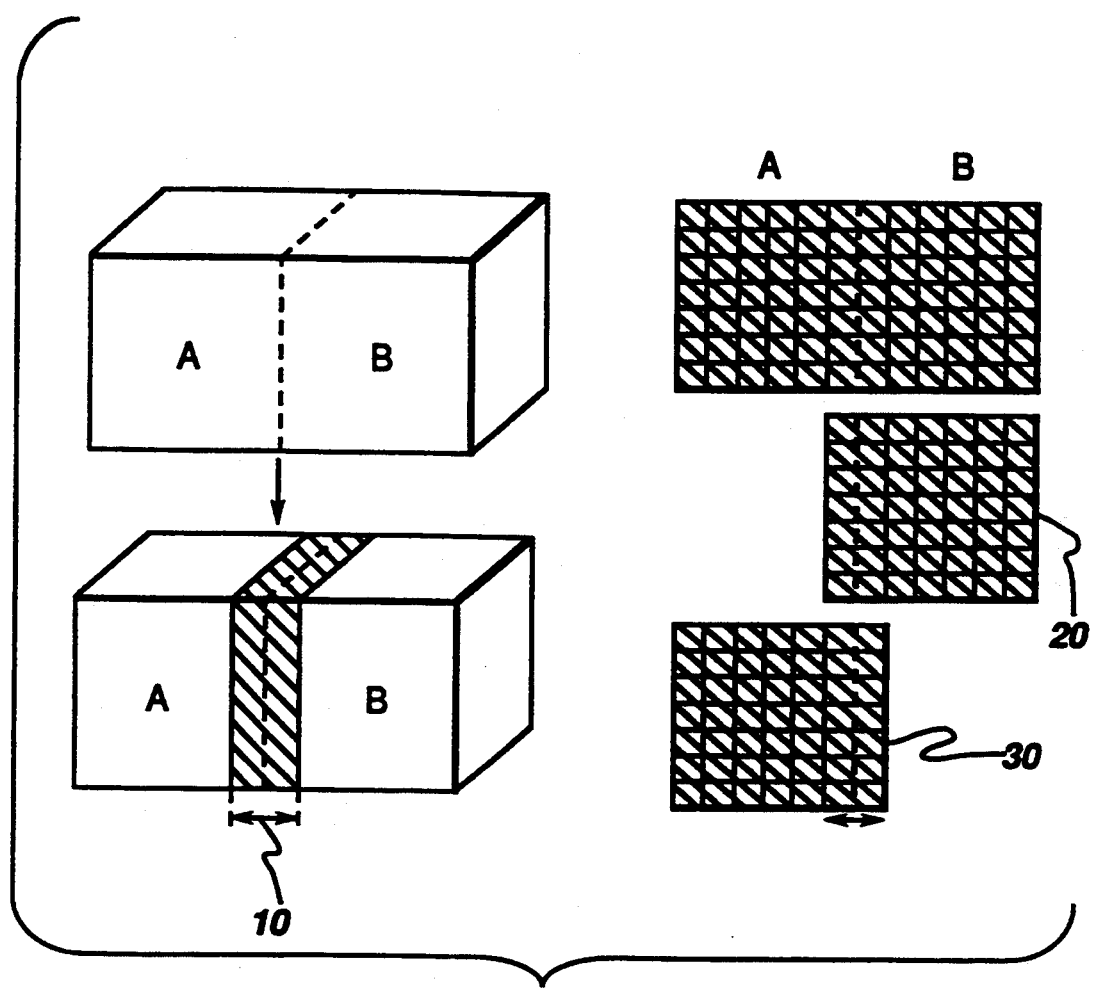
FIG. 10 depicts the process of data padding.
Figure 11:
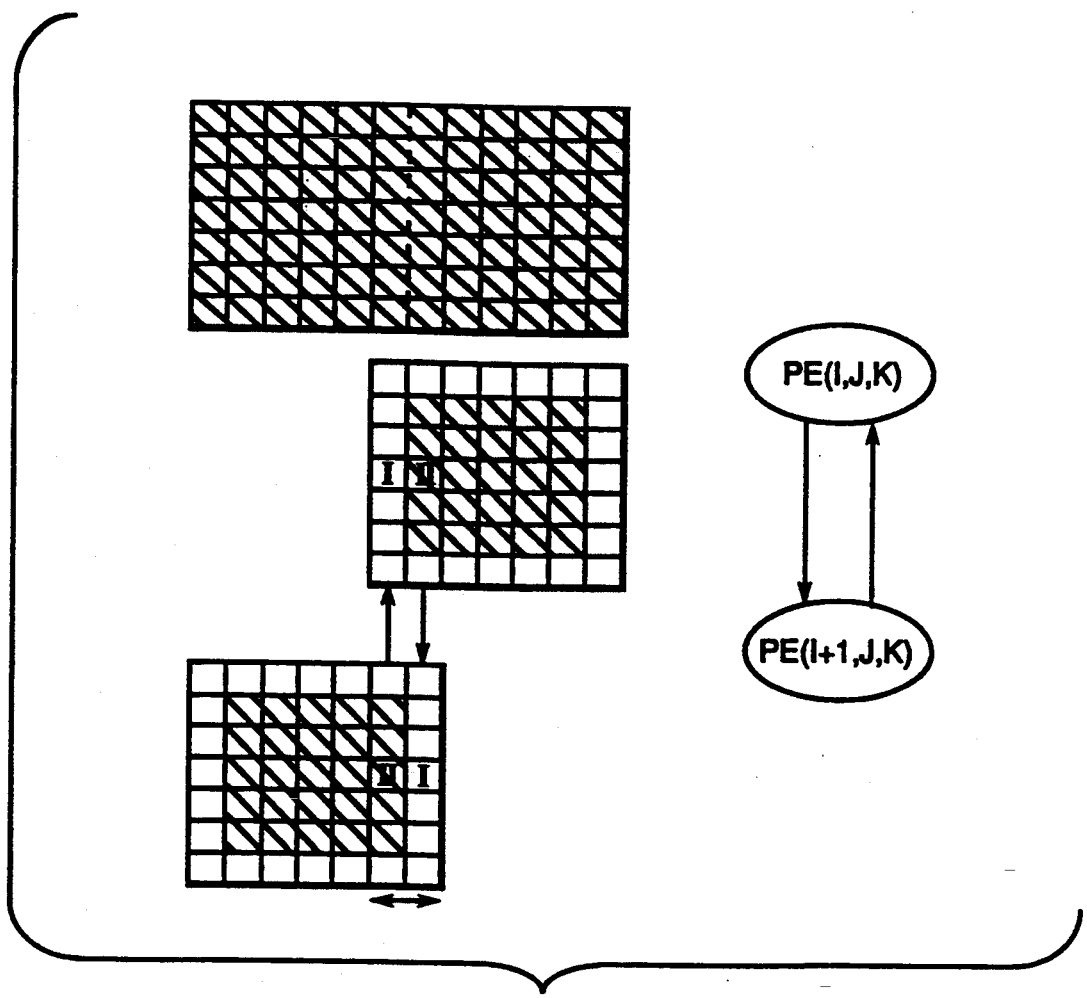
FIG. 11 depicts the process of data swapping.

In order to ensure data completeness after local operations are performed, a novel procedure for performing data replacement via inter-processor communication within the parallel computer of the present invention has been developed. After the 3D voxel set is divided into a set of voxel sub-cubes as detailed above, sub-cubes are individually distributed to processor elements in the parallel computer. Within each processor element, the sub-cube data set is padded with the voxel data in the overlap region extracted from its nearest neighbor's processing elements. The size of the overlap region depends on the size of the operation kernel being used for the particular image processing operation. For a $K_x \times K_y \times K_z$ kernel, where $K_x$, $K_y$, and $K_z$ are odd, the size of the overlap region along the XP, XN, YP, YN, ZP, and ZN directions is $K_x/2, K_x/2, K_y/2, K_y/2, K_z/2$, and $K_z/2$ respectively Referring to FIG. 10, two adjacent voxel sub-cubes labelled A and B are shown. Region 10 is the overlap region. Sub-cube 20 is B padded and sub-cube 30 is A padded. To ensure data completeness, data in the overlap regions of two directly connected processor elements needs to be replaced. As shown in FIG. 11, data in the overlap region I of processor element PE(I,J,K) is replaced by the data in the overlap region II of processor element PE(I+1,J,K) and the data in the overlap region I of processor element PE(I+1,J,K) is replaced by the data in the overlap region II of processor element PE(I,J,K). For each voxel sub-cube, six overlap regions along the XP, XN, YP, YN, ZP, and ZN directions need to be updated after each local operation. Since the overlap regions along any two axes overlap on each other at the vertices, data replacement has to be carried out in three separate steps which are performed sequentially in any order, along the XP and XN directions, the YP and YN directions, and the ZP and ZN directions.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A parallel computer architecture for voxel processing comprising:

a plurality of processor elements constructed in a cube-like structure having a plurality of rows, columns, and planes, each processor element comprising a memory, a CPU, a float point unit, and six communication ports, each processor element connected via said communication ports to its nearest neighbor processor element, wherein said processor elements comprise internal, vertex, edge, and face processor elements and wherein said vertex, edge and face processor elements are in a cross-row, cross-column, and cross-plane communicable relationship with other vertex, edge and face processor elements, in said cross-row communicable relationship, a first processor element in a row is in direct communication with a last processor element in a previous row except for a first row, in said cross-column communicable relationship, a first processor element in a column is in direct communication with a last processor element in a previous column except for a first column, in said cross-plane communicable relationship, each of the processor elements in a first plane except processor elements in a first column of the first plane is in direct communication with a processor element from a previous column of the same row in a last plane.

2. The parallel computer of claim 1 wherein each said communication port has an input port and an output port.

3. The parallel computer of claim 1, wherein the first processor element in the first row, column, and plane and the last processor element in the last row, column, and plane are each connected to a host computer.

4. The parallel computer of claim 1, wherein each of the processor elements in a first plane of said cross-plane communicable relationship except processor elements in a first row of the first plane is in direct communication with a processor element from a previous row of the same column in a last plane.

5. A grain structured processing architecture device comprising:

a plurality of processor elements constructed in a grain structured architecture having a plurality of rows, columns, and planes, each processor element communicating in a cross-row, cross-column, and cross-plane communicable relationship with other processor elements, in said cross-row relationship, a first processor element in a row is in direct communication with a last processor element in a previous row except for a processor element in a first row, in said cross-column relationship, a first processor element in a column is in direct communication with a last processor element in a previous column except for a processor element in a first column, in said cross-plane communicable relationship, each of the processor elements in a first plane except processor elements in a first column of the first plane is in direct communication with a processor element from a previous column of the same row in a last plane.

6. A grain structured processing architecture device according to claim 5, wherein each processor element is classified as at least one of an internal processor element, a vertex processor element, an edge processor element, and a face processor element.

7. A grain structured processing architecture device according to claim 6, wherein an internal processor element is connected to six processor elements and the vertex processor element, the edge processor element, and the face processor element are connected to six or less processor elements.

8. A grain structured processing architecture device according to claim 5, wherein each processing element has an input and output communication port for direct inter-processor communication.

9. A grain structured processing architecture device according to claim 8, wherein each processing element has an input and output communication port in six directions.

10. A grain structured processing architecture device according to claim 5, wherein the first processor element in the first row, column, and plane and the last processor element in the last row, column, and plane are each connected to a host computer.

11. The grain structured processing architecture device according to claim 5, wherein each of the processor elements in a first plane of said cross-plane communicable relationship except processor elements in a first row of the first plane is in direct communication with a processor element from a previous row of the same column in a last plane.

12. A grain structured processing architecture device comprising:

a plurality of processor elements constructed in a grain structured architecture having a plurality of rows, columns, and planes, each processor element communicating in a cross-row, cross-column, and cross-plane communicable relationship with other processor elements, in said cross-row relationship, a first processor element in a row is in direct communication with a last processor element in a previous row except for a processor element in a first row, in said cross-column relationship, a first processor element in a column is in direct communication with a last processor element in a previous column except for a processor element in a first column, in said cross-plane communicable relationship, each of the processor elements in a first plane except processor elements in a first column of the first plane is in direct communication with a processor element from a previous column of the same row in a last plane, the first processor element in the first row, column, and plane and the last processor element in the last row, column, and plane are each connected to a host computer.

13. A grain structured processing architecture device according to claim 12, wherein each of the processor elements in a first plane of said cross-plane communicable relationship except processor elements in a first row of the first plane is in direct communication with a processor element from a previous row of the same column in a last plane.

* * * * *